United States Patent
Tan et al.

(10) Patent No.: US 12,439,315 B2
(45) Date of Patent: Oct. 7, 2025

(54) COMMUNICATION METHOD FOR MULTIMODE TERMINAL AND COMMUNICATION APPARATUS

(71) Applicant: UNISOC(CHONGQING) TECHNOLOGIES CO., LTD., Chongqing (CN)

(72) Inventors: Shu Tan, Chongqing (CN); Wei Guan, Chongqing (CN); Miao Xian, Chongqing (CN)

(73) Assignee: UNISOC (CHONGQING) TECHNOLOGIES CO., LTD., Chongqing (CN)

( * ) Notice: Subject to any disclaimer, the term of this patent is extended or adjusted under 35 U.S.C. 154(b) by 377 days.

(21) Appl. No.: 18/029,241

(22) PCT Filed: Sep. 3, 2021

(86) PCT No.: PCT/CN2021/116555
§ 371 (c)(1),
(2) Date: Mar. 29, 2023

(87) PCT Pub. No.: WO2022/068527
PCT Pub. Date: Apr. 7, 2022

(65) Prior Publication Data
US 2024/0015628 A1 Jan. 11, 2024

(30) Foreign Application Priority Data
Sep. 29, 2020 (CN) .......................... 202011054755.1

(51) Int. Cl.
*H04B 7/00* (2006.01)
*H04L 5/14* (2006.01)
(Continued)

(52) U.S. Cl.
CPC ............. *H04W 36/304* (2023.05); *H04L 5/14* (2013.01); *H04W 36/08* (2013.01)

(58) Field of Classification Search
CPC ... H04W 36/304; H04W 36/08; H04W 48/06; H04W 48/16; H04W 48/20; H04L 5/14; Y02D 30/70
See application file for complete search history.

(56) References Cited

U.S. PATENT DOCUMENTS

| | | | |
|---|---|---|---|
| 2009/0080349 A1* | 3/2009 | Rofougaran | H04W 52/0261 370/311 |
| 2009/0081971 A1* | 3/2009 | Rofougaran | H04W 52/0245 455/127.1 |
| 2012/0190361 A1 | 7/2012 | Shaikh et al. | |

FOREIGN PATENT DOCUMENTS

| | | |
|---|---|---|
| CN | 101155390 A | 4/2008 |
| CN | 102421153 A | 4/2012 |

(Continued)

OTHER PUBLICATIONS

Intel, CR on requirement applicability for non-BL CE UE for R15, 3GPP TSG-RAN4 Meeting#90bis, R4-1902904, Apr. 12, 2019.
(Continued)

*Primary Examiner* — Thai Dinh Hoang
(74) *Attorney, Agent, or Firm* — Hauptman Ham, LLP

(57) ABSTRACT

A communication method for a multimode terminal and a communication apparatus are provided. The method includes: obtaining network camping preferable mode; and selecting a first target cell for communication when the network camping preferable mode is a rate-based selection mode, where throughput of the first target cell satisfies a target throughput requirement; or selecting a second target cell for communication when the network camping preferable mode is a power-consumption-based selection mode, where the second target cell satisfies a preset power-consumption condition, and the preset power-consumption condition is determined according to a cell selection reception level value and a cell selection quality value; or selecting a (Continued)

third target cell for communication when the network camping preferable mode is a hybrid selection mode, where the third target cell satisfies the preset power-consumption condition, and/or throughput of the third target cell satisfies the target throughput requirement.

20 Claims, 7 Drawing Sheets

(51) Int. Cl.
*H04W 36/08* (2009.01)
*H04W 36/30* (2009.01)

(56) References Cited

FOREIGN PATENT DOCUMENTS

| | | | |
|---|---|---|---|
| CN | 103582070 | A | 2/2014 |
| CN | 106454969 | A | 2/2017 |
| CN | 107295618 | A | 10/2017 |
| CN | 108076489 | A | 5/2018 |
| CN | 109474929 | A | 3/2019 |
| CN | 110708730 | A | 1/2020 |
| CN | 111224766 | A | 6/2020 |
| CN | 111294890 | A | 6/2020 |
| KR | 20240178545 | A * | 12/2024 .......... H04W 52/343 |

OTHER PUBLICATIONS

WIPO, International Search Report and Written Opinion for International Application No. PCT/CN2021/116555, Nov. 26, 2021.
CATT, Discussion on Cell Selection for CE mode, R2-151212, Apr. 10, 2015.
The first office action issued in corresponding CN application No. 202011054755.1 dated Nov. 7, 2022.

* cited by examiner

COMMUNICATION METHOD FOR MULTIMODE TERMINAL AND COMMUNICATION APPARATUS

CROSS-REFERENCE TO RELATED APPLICATION(S)

This application is a National Stage of International Application No. PCT/CN2021/116555, field Sep. 3, 2021, which claims priority to Chinese Patent Application No. 2020110547551, filed Sep. 29, 2020, the entire disclosure of which are hereby incorporated by reference.

TECHNICAL FIELD

This disclosure relates to the field of communication technologies, and in particular, to a communication method for a multimode terminal and a communication apparatus.

BACKGROUND

Mobile communication application scenarios may be classified into three categories: enhanced mobile broadband (eMBB), massive machine-type communication (mMTC), ultra-reliable and low latency communication (URLLC). With diversification of market demands, in fact, some application scenarios are exactly located in vague areas between mMTC and URLLC/eMBB. For example, a massive industrial wireless sensor network (IWSN) scenario in the internet-of-everything age has demands for data rate throughput, reliability/low time delay, and size/cost/power consumption. This application scenario, as a whole, has demands higher than the low-power-consumption wide-area internet-of-things (IOT), but lower than URLLC/eMBB, and is located in an intermediate vague area typically. IWSN may also be referred to as medium-rate IOT. Medium-rate IOT scenarios can further include a video monitoring system used for terminal-information collection in a smart city/a smart factory system, a smart watch/wristband/medical monitoring in a wear scenario, and the like.

In the 3rd Generation Partnership Project (3GPP), the medium-rate IOT scenarios are classified according to indexes thereof, as illustrated in table 1.

TABLE 1

Typical scenarios and key indexes

| Scenario | Communication-service availability | End-to-end delay | Reference rate |
|---|---|---|---|
| Industrial wireless sensors | 99.99% | <100 ms(millisecond); <10 ms security-related | <2 million bits per second (Mbps) |
| Video monitoring | 99%-99.9% | <500 ms | 2-4 Mbps (typical value) 7.5-25 Mbps (intermediate value) |

In scenarios such as industrial wireless sensors and video monitoring, Medium-rate IOT requires electronic devices to collect a large amount of data and upload the data to clouds, and therefore the medium-rate IOT has a high requirement for an uplink transmission service, that is to say, the medium-rate IOT is heavy uplink loaded. Currently, none of these three scenarios of eMBB, mMTC, and URLLC can satisfy the indexes of the medium-rate IOT as illustrated in table 1. In addition to having no corresponding mobile communication application scenario matched, the medium-rate IOT also faces challenges in how to perform high-quality communication with networks deployed by various operators. In addition, due to unbalanced development of global mobile communication network, 5G has not achieved seamless coverage, such that 4G technology also needs to be adopted for communication supplementation in the medium-rate IOT scenarios. In view of a long life cycle (e.g., a typical life cycle of 5~10 years) of IOT deployment and imbalance of global network deployment releases, solutions of the medium-rate IOT need to adapt to diverse requirements of operators.

For example, head operators are doing 5G deployment, and at the same time, expect to immediately start to gradually redeploy valuable spectrum resources originally deployed to 4G to 5G. Continuous deployment of a large number of 4G IOT terminals brings increase resistance to redeployment, and operators are unable to achieve maximum spectrum utilization. For another example, emerging operators only do 5G deployment, and expects a medium-rate IOT terminal to directly support reduced capability NR devices (RedCap). For another example, an operator has no 5G deployment plan in a short term, and continues 4G deployment, but has a 5G deployment demand in five years.

Therefore, when the medium-rate IOT still adopts a traditional communication mode, such as a single-mode scheme of 4G or a single-mode scheme of 5G NR RedCap, the medium-rate IOT is unable to adapt to diverse requirements of various operators, which will degrade the network performance.

SUMMARY

In a first aspect of implementations of the present disclosure, a communication method for a multimode terminal is provided. The method includes the following.

Obtain network camping preferable mode, where the network camping preferable mode includes a rate-based selection mode, a power-consumption-based selection mode, and a hybrid selection mode.

Select a first target cell for communication when the network camping preferable mode is the rate-based selection mode, where throughput of the first target cell satisfies a target throughput requirement. Or, select a second target cell for communication when the network camping preferable mode is the power-consumption-based selection mode, where the second target cell satisfies a preset power-consumption condition, and the preset power-consumption condition is determined according to a cell selection reception level value and a cell selection quality value. Or, select a third target cell for communication when the network camping preferable mode is the hybrid selection mode, where the third target cell satisfies the preset power-consumption condition, and/or throughput of the third target cell satisfies the target throughput requirement.

In a second aspect, a communication apparatus is provided in implementations of the present disclosure. The communication apparatus includes a processor, a memory, and a user interface, where the processor, the memory, and the user interface are connected with one another, the memory is configured to store a computer program, the computer program includes a program instruction, and the processor is configured to invoke the program instruction to execute the communication method for a multimode terminal in the first aspect.

In a third aspect, a non-transitory computer readable storage medium is provided in implementations of the present disclosure. The non-transitory computer readable storage medium stores one or more instructions, and the one or more instructions are configured to be loaded by a processor to execute the communication method for a multimode terminal in the first aspect.

BRIEF DESCRIPTION OF THE DRAWINGS

In order to explain technical solutions in implementations of the present disclosure more clearly, the following will give a brief introduction to accompanying drawings which are needed to be used in description of the implementations. Apparently, the accompanying drawings in the following description are merely some implementations of the present disclosure. For those skilled in the art, other accompanying drawings can be obtained according to these accompanying drawings without creative efforts.

DETAILED DESCRIPTION

The following will describe technical solutions in implementations of the present disclosure clearly and completely with reference to the accompanying drawings in implementations of the present disclosure.

In order to better understand implementations of the present disclosure, technical terms involved in implementations of the present disclosure are introduced below.

Frequency-division duplexing (FDD): an uplink from a terminal device to an access network device and a downlink from an access network device to a terminal device operate at two different frequencies that satisfy a certain frequency interval requirement. This mode operates in a symmetrical frequency band. FDD is applicable to a wireless communication system that provides a single wireless frequency channel for each user.

Time-division duplex (TDD): an uplink and a downlink operate at the same frequency. Information transmission in the uplink and information transmission in the downlink may be performed at the same carrier frequency and different slots, so that information transmission in the uplink and information transmission in the downlink do not interfere with each other.

A user equipment category (Cat.) indicates the highest download/upload rate of a terminal device. Up to 3GPP R13 release, the UE-category already includes abundant level options such as category-NB1 (Cat-NB1), category-M1 (Cat-M1), category-1bis (Cat-1bis), and category-19 (Cat-19). The UE-Category mainly defines an uplink/downlink rate that can be supported by a UE. Cat-0 is a LTE terminal level that supports a lower rate and lower power-consumption. Cat-0 can realize connection between a lower-power-consumption and lower-cost IOT device and an LTE network. Support for a lower category is very crucial to IOT applications such as a wearable device, a smart home, and a smart electricity meter. The maximum working bandwidth of a Cat-M1 device is only 1.4 MHz, and the maximum supportable rate of the Cat-M1 device is 1 Mbps. In addition, Cat-1bis and Cat-4 mentioned in implementations of the present disclosure each belong to one of UE-categories.

A reduced capability NR device (RedCap), which is also known as 5G NR RedCap, uses a NR interface, but its complexity/cost is close to 4G. In addition, lower capability of 5G may also be a reduced mode of 5G.

In order to better understand implementations of the present disclosure, a network architecture to which implementations of the present disclosure can be applied is described below.

Figure 1:
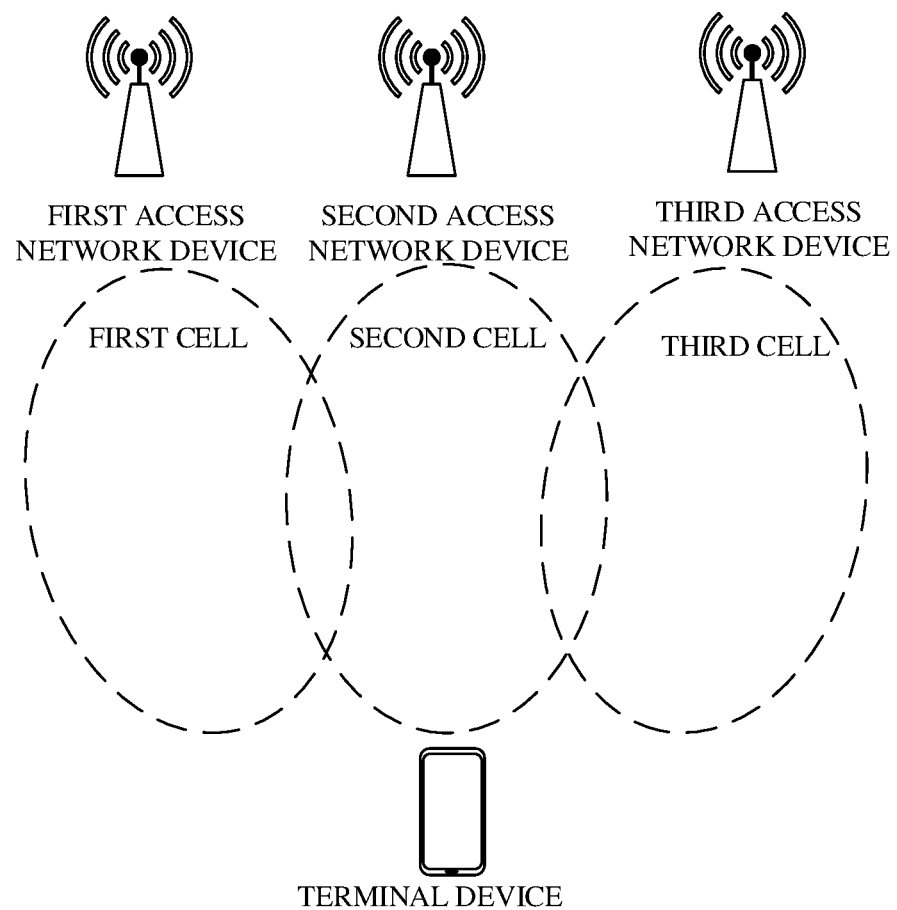
FIG. 1 is a schematic diagram of a network architecture of multimode terminal communication provided in implementations of the present disclosure.

Reference is made to FIG. 1, which is a schematic diagram of a network architecture of multimode terminal communication provided in implementations of the present disclosure. As illustrated in in FIG. 1, the network architecture may include an access network device, a serving cell, and a terminal device. The access network device may include a first access network device, a second access network device, and a third access network device, and accordingly, the serving cell may also include a first cell, a second cell, and a third cell. In these three serving cells, each serving cell may belong to any one of three access network devices in FIG. 1. Certainly, in practice, the network architecture may include more than three access network devices, and one access network device may be distributed in one or more serving cells, which is not limited in implementations of the present disclosure. It should be noted that an access network device may deploy multiple frequency points, and each frequency point may be distributed in one or more serving cells.

The access network device involved in implementations of the present disclosure is an entity for transmitting or receiving a signal at a network side, and can be used for performing mutual conversion between a received air frame and an Internet protocol (IP) packet. The access network device serves as a router between a terminal device and the rest of an access network, where the rest of the access network may include an IP network, etc. The access network device may also coordinate management of attributes of an air interface. For example, the access network device may be an eNB in LTE, a new radio controller (NR controller), a gNB in a 5G system, a centralized unit, a new radio base-station, a radio remote module, a micro base-station, a relay, a distributed unit, a transmission reception point (TRP) or a transmission point (TP), or any other wireless access device, which is not limited in implementations of the present disclosure.

The terminal device involved in implementations of the present disclosure is an entity for receiving or transmitting a signal at a user side. A terminal device may be a device that provides voice and/or data connectivity to a user, for example, a handheld device having a wireless connection function, a vehicle-mounted device, and the like, which is not limited in implementations of the present disclosure, The terminal device may also be other processing devices connected with a wireless modem. The terminal device may communicate with a radio access network (RAN). The terminal device may also be referred to as a wireless terminal, a subscriber unit, a subscriber station, a mobile station, a remote station, an access point, a remote terminal, an access terminal, a user terminal, a user agent, a user device, a user equipment, or the like. The terminal device may be a mobile terminal, such as a mobile phone (or referred to as "cellular" radio telephone), a computer equipped with a mobile terminal, and the like. For example, the terminal device may be a portable, pocket-sized, handheld, computer-built, or vehicle-mounted mobile device that exchanges language and/or data with the wireless access network. For example, the terminal device may also be a personal communication service (PCS) phone, a cordless phone, a session initiation protocol (SIP) phone, a wireless local loop (WLL) station, a personal digital assistant (PDA), or other devices, or the like. Common terminal devices include, for example, a mobile phone, a tablet computer, a notebook computer, a palmtop computer, a mobile Internet device (MID), a vehicle, a roadside device, an aircraft, and a wearable device such as a smart watch, a smart bracelet, and a pedometer, which is not limited in implementations of the present disclosure. A communication method and relevant device provided in the present disclosure are described in detail hereinafter.

In order to satisfy network performance requirements of a medium-rate IOT, a communication method for a multimode terminal and a communication apparatus are provided in implementations of the present disclosure. The following further describes in detail the communication method for a multimode terminal and the communication apparatus provided in implementations of the present disclosure.

Figure 2:
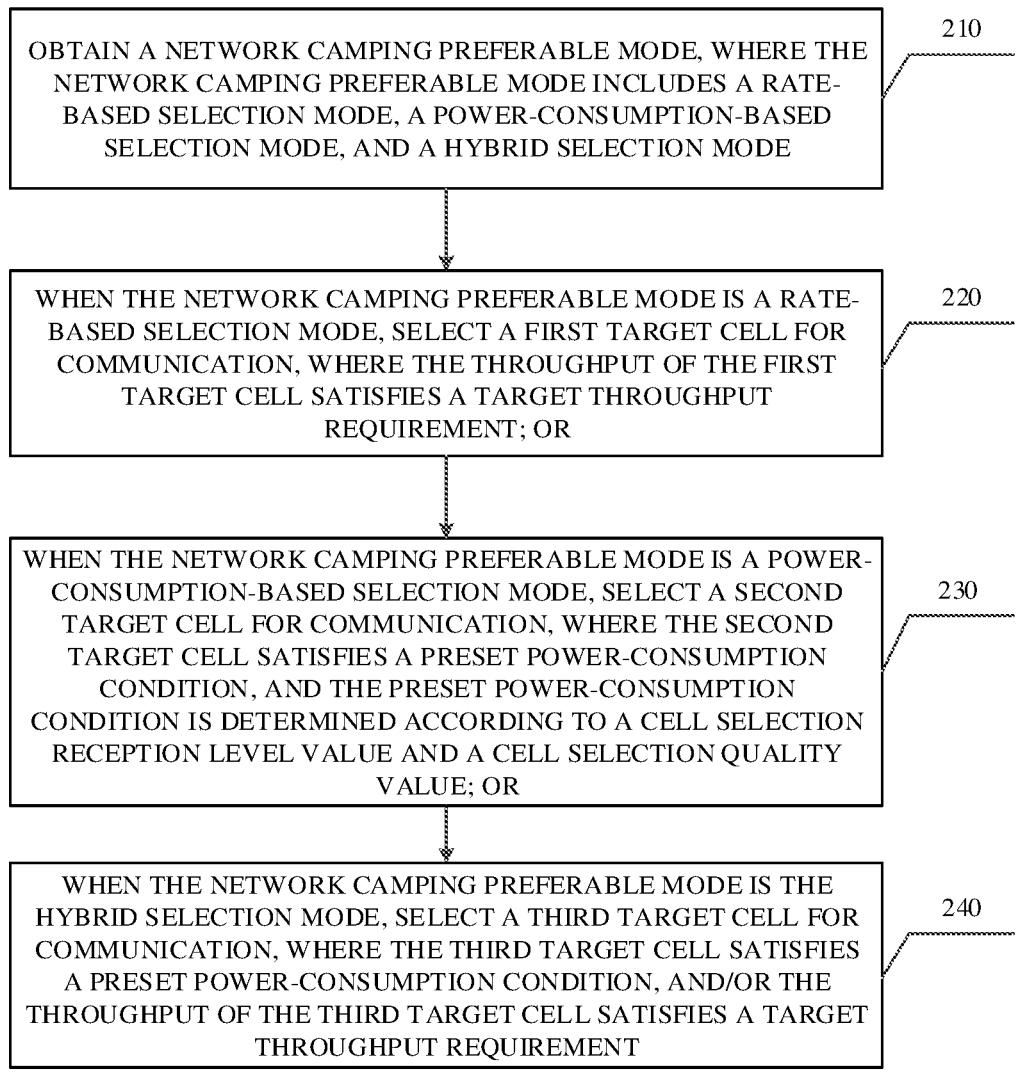
FIG. 2 is a schematic flowchart of a communication method for a multimode terminal provided in implementations of the present disclosure.

Reference is made to FIG. 2, which is a schematic flowchart of a communication method for a multimode terminal provided in implementations of the present disclosure. The implementations may be executed by a terminal device, and the terminal device may be a multimode terminal device. The "multimode" of the multimode terminal device in implementations of the present disclosure may include one or more 4G modes selected from Cat-M1, Cat-0, Cat-1bis, and Cat-4 and one or more 5G modes selected from 5G NR RedCap and 5G lower capacity. When the process illustrated in FIG. 2 is performed by the terminal device, following operations may be included.

At 210, obtain a network camping preferable mode, where the network camping preferable mode includes a rate-based selection mode, a power-consumption-based selection mode, and a hybrid selection mode.

The terminal device may know which type of cells the terminal device prefers to select according to the network camping preferable mode obtained, and when selecting a cell, the terminal device preferentially selects a cell matching the selected mode for communication. The network camping preferable mode may be preset when the terminal device leaves the factory, and may also be defined by a user. The terminal device may obtain the network camping preferable mode when starting, so as to perform cell reselection; or the terminal device may obtain the network camping preferable mode again after connecting to a certain cell and detecting that the network camping preferable mode is changed, so as to perform cell reselection.

The network camping preferable mode of the terminal device may include a rate-based selection mode, a power-consumption-based selection mode, and a hybrid selection mode.

The rate-based selection mode may also be referred to as rate preference mode, and the rate preference mode requires throughput of a cell selected by the terminal device to satisfy a target throughput requirement. For example, when the network camping preferable mode is the rate-based selection mode, in response to detecting that the throughput of the first cell satisfies the target throughput requirement, the terminal device camps on the first cell for data communication.

The power-consumption-based selection mode may also be referred to as a power-consumption preference mode, and the power-consumption preference mode requires that power consumption of communication between the terminal device and a cell selected by the terminal device is low enough to satisfy a preset power-consumption condition. For example, when the network camping preferable mode is a power-consumption-based selection mode, once the terminal device detects that the first cell satisfies the preset power-consumption condition best, the terminal device camps on the first cell for data communication.

The hybrid selection mode may also be referred to as a rate-and-power-consumption compromise mode. The rate-and-power-consumption compromise mode considers both the rate preference mode and the power-consumption preference mode, so that the terminal device can perform high-rate communication with the selected cell, and low power-consumption of a system can be ensured at the same time. For example, when the network camping preferable mode is the hybrid selection mode, and once the terminal device detects that the first cell satisfies the preset power-consumption condition and the throughput of the first cell also satisfies the target throughput condition, the terminal device camps on the first cell for data communication.

At 220, when the network camping preferable mode is a rate-based selection mode, select a first target cell for communication, where throughput of the first target cell satisfies a target throughput requirement.

After the terminal device determines that the network camping preferable mode is the rate-based selection mode, the terminal device firstly determines whether throughput of the first cell currently measured satisfies the target throughput requirement. If the throughput of the first cell currently measured satisfies the target throughput requirement, determine the first cell as the first target cell, and select the first cell for communication. If the throughput of the first cell currently measured does not satisfy the target throughput requirement, determine the first target cell through manual network selection method in an FDD frequency band.

At 230, when the network camping preferable mode is a power-consumption-based selection mode, select a second target cell for communication, where the second target cell satisfies a preset power-consumption condition, and the preset power-consumption condition is determined according to a cell selection reception level value Srxlev and a cell selection quality value Squal.

After the terminal device determines that the network camping preferable mode is the rate-based selection mode, the terminal device will firstly determine whether the first cell currently measured satisfies the preset power-consumption condition. If the first cell currently measured satisfies the preset power-consumption condition, determine the first cell as a second target cell, and select the first cell for communication. If the first cell currently measured does not satisfy the preset power-consumption condition, perform neighbouring cell measurement to obtain a first candidate frequency-point set, where the first candidate frequency-point set includes a frequency point satisfying the preset power-consumption condition. The terminal device may determine the second target cell according to the first candidate frequency-point set.

At 240, when the network camping preferable mode is a hybrid selection mode, select a third target cell for communication, where the third target cell satisfies the preset power-consumption condition, and the throughput of the third target cell satisfies a target throughput requirement.

After the terminal device determines that the network camping preferable mode is the hybrid selection mode, the terminal device will firstly determine whether the first cell satisfies currently measured satisfies the preset power-consumption condition and whether throughput of the first cell satisfies the target throughput requirement. If the first cell satisfies currently measured satisfies the preset power-consumption condition and throughput of the first cell satisfies the target throughput requirement, determine the first cell as the third target cell. If the first cell does not satisfy currently measured satisfies the preset power-consumption condition and throughput of the first cell does not satisfy the target throughput requirement, perform neighbouring cell measurement to obtain a second candidate frequency-point set, where the second candidate frequency-point set includes a frequency point satisfying the preset power-consumption condition, throughput of the frequency point satisfies the target throughput requirement. The terminal device can determine a third target cell according to the second candidate frequency-point set.

It should be noted that numbers such as 220, 230, and 240 are used herein for the purpose of describing corresponding contents more clearly and briefly, and do not constitute a substantive limitation to the order. For example, when the network camping preferable mode is a rate-based selection mode, the terminal device only performs operations at 220 and does not execute operations at 230 or operations at 240; when the network camping preferable mode is the power-consumption-based selection mode, the terminal device only performs operations at 230, and does not execute operations at 220 or operations at 240, and so on.

Through implementations of the present disclosure, the terminal device can obtain the network camping preferable mode, and select an appropriate target cell for communication according to different network camping preferable modes, so that the terminal device can flexibly take account of both communication rate and power consumption.

Figure 3:
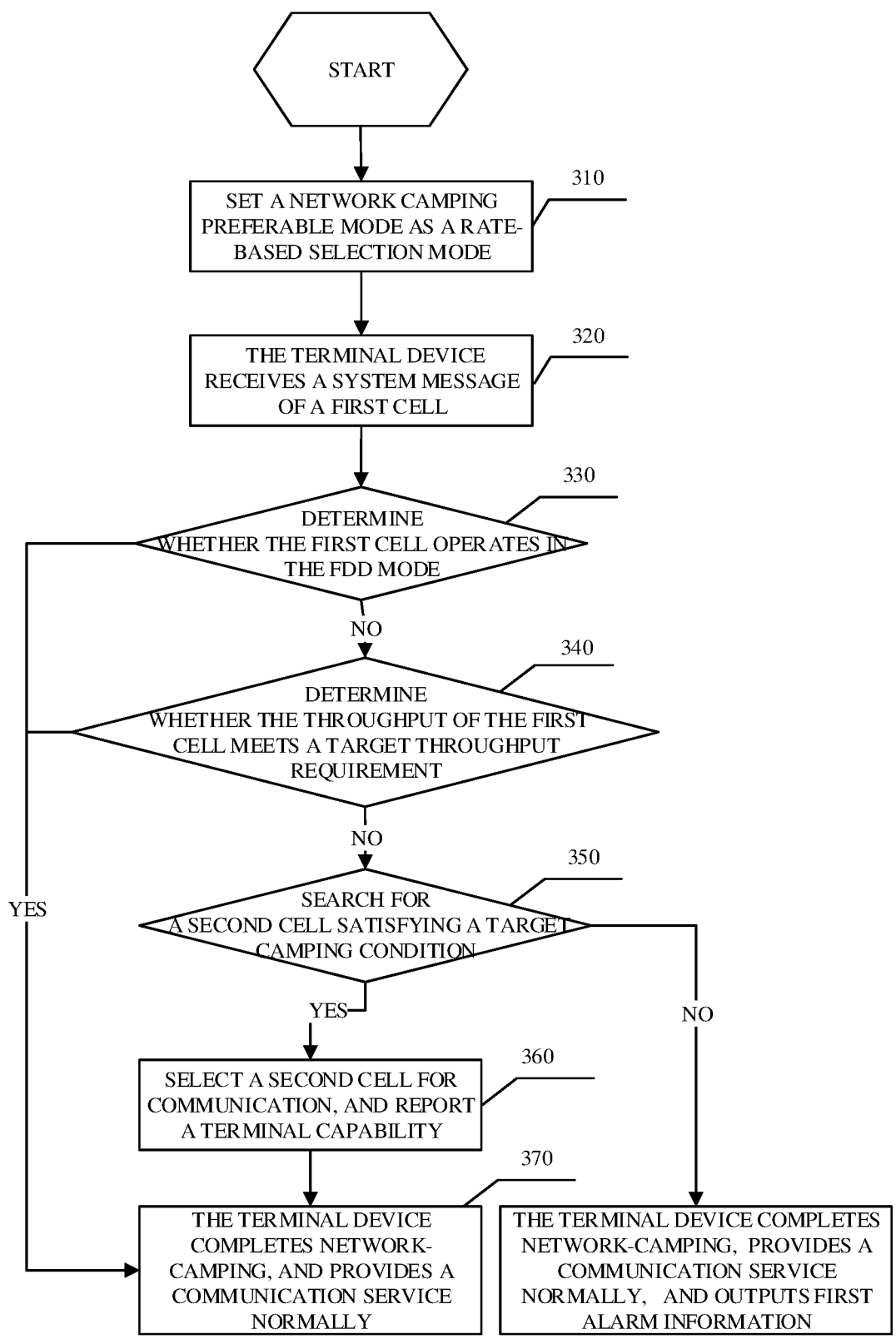
FIG. 3 is a schematic flowchart of selection of a first target cell according to a rate-based selection mode provided in implementations of the present disclosure.

Reference is made to FIG. 3, which is a schematic flowchart of selection of a first target cell according to a rate-based selection mode provided in implementations of the present disclosure. In other words, implementations as illustrated in FIG. 3 is a detailed description of operations at 220. The schematic flowchart illustrated in FIG. 3 may include the following.

At 310, set a network camping preferable mode as a rate-based selection mode.

At 320, the terminal device receives a system message of a first cell.

The system message may be a system information block (SIB). The system message may include mode information of the first cell, and the mode information indicates that the first cell operates in an FDD mode or a TDD mode.

The first cell is a cell currently measured by the terminal device, and the first cell may belong to the first access network device in FIG. 1.

At 330, determine whether the first cell operates in the FDD mode.

The terminal device may determine, according to the received system message of the first cell, whether the first cell operates in the FDD mode. When the first cell operates in the FDD mode, the terminal device may determine that the throughput of the first cell satisfies a target throughput requirement, determine the first cell as a first target cell, and directly execute operations at 370 to establish a communication connection with the first cell for normal communication. When the terminal device determines that the first cell operates in the TDD mode, proceed to operations at 340. It can be understood that, in this implementation, the terminal device can assume by default that throughput of a cell that operates in the FDD mode satisfies the target throughput requirement.

In a possible implementation, when a network distributed in the first cell is a 4G network, the terminal device can determine, according to a message entity of a frequency bandwidth indicator (freqBandIndicator) in SIB Type1, whether the first cell operates in the FDD mode. When the freqBandIndicator takes a specific value, it may indicate that the first cell operates in the FDD mode. For example, when the value of the freqBandIndicator is 1, 2, or 3, it indicates that the first cell operates in the FDD mode.

In a possible implementation, when the network distributed in the first cell is a 5G network, the terminal device can determine, according to a message entity of "tdd-UL-DL-ConfigurationCommon" in SIB Type 1, whether the first cell operates in FDD mode. Since the tdd-UL-DL-ConfigurationCommon exists only in SIB Type1 of a cell operating in the TDD mode, the terminal device may determine that the first cell operates in the FDD mode when no tdd-UL-DL-ConfigurationCommon is detected in SIB Type1 of the first cell; otherwise, the terminal device may determine that the first cell operates in the TDD mode.

In a possible implementation, when the network distributed in the first cell is the 5G network, the terminal device can also determine according to a message entity of "freqBandIndicatorNR" in SIB Type1, whether the first cell operates in FDD mode. When the freqBandIndicatorNR takes a specific value, the first cell is determined to operate in the FDD mode, and when the freqBandIndicatorNR takes a value other than the specific value, the first cell is determined to operate in the TDD mode.

At 340, determine whether the throughput of the first cell satisfies a target throughput requirement.

When the terminal device detects that the first cell operates in the TDD mode, the terminal device needs to determine whether the throughput of the first cell satisfies the target throughput requirement. When the throughput of the first cell satisfies the target throughput requirement, determine the first cell as the target cell, and proceed to operations at 370 to establish a communication connection with the first cell for normal communication. When the throughput of the first cell does not satisfy the target throughput, proceed to operations at 350.

In a possible implementation, when the network distributed in the first cell is the 4G network, the terminal device may firstly determine an uplink/downlink slot ratio and a ratio of a special subframe according to a message entity of "TDD-Config" in SIB Type1 of the first cell. For example, the uplink/downlink slot ratio is illustrated in table 2, where "U" in table 2 represents an uplink subframe, "D" represents a downlink subframe, and "S" represents a special subframe. An uplink/downlink ratio DL:UL of sa0 is 1:3, an uplink/downlink ratio DL:UL of sa1 is 2:2, an uplink/downlink ratio DL:UL of sa2 is 3:1, and so on. The terminal device may also obtain the ration of the special subframe through a special subframe configuration table.

TABLE 2 uplink/downlink ratio table

| Uplink/downlink configuration | Downlink to uplink conversion period | Subframe number | | | | | | | | | |
|---|---|---|---|---|---|---|---|---|---|---|---|
| | | 0 | 1 | 2 | 3 | 4 | 5 | 6 | 7 | 8 | 9 |
| sa0 | 5 ms | D | S | U | U | U | D | S | U | U | U |
| sa1 | 5 ms | D | S | U | U | D | D | S | U | U | D |
| sa2 | 5 ms | D | S | U | D | D | D | S | U | D | D |
| sa3 | 10 ms | D | S | U | U | U | D | D | D | D | D |
| sa4 | 10 ms | D | S | U | U | D | D | D | D | D | D |
| sa5 | 10 ms | D | S | U | D | D | D | D | D | D | D |
| sa6 | 5 ms | D | S | U | U | U | D | S | U | U | D |

The terminal device may calculate a theoretical value of an uplink peak rate (Peak-T-put-UL) and a theoretical value of a downlink peak rate (Peak-T-put-DL) according to the determined uplink/downlink slot ratio, the ratio of the special sub-frame, and terminal device category. For example, when a terminal category is Cat.1 (an FDD peak rate DL/UL=10 Mbps/5 Mbps), an uplink/downlink slot ratio of a camped cell is 2 (compared with the FDD, a rate contribution of 3.75/5 may be made in a downlink direction, and a rate contribution of 1/5 may be made in an uplink direction), and the ratio of the special subframe is 7 (compared with the FDD, a rate contribution of 0.75 may be made in the downlink direction, and the uplink direction is unable to carry services), then it can be calculated that Peak-T-put-UL=1 Mbps, and Peak-T-put-DL=7.5 Mbps.

If uplink throughput requirement (T-put-UL-requirement) >Peak-T-put-UL*Th, and downlink throughput requirement (T-put-DL-requirement)>Peak-T-put-UL*Th, the throughput of the first cell is determined to satisfy the target throughput requirement; otherwise, the throughput of the first cell is determined not to satisfy the target throughput requirement. Th may range from 0.1 to 0.8, where the uplink throughput requirement and the downlink throughput requirement are determined by the terminal device.

In a possible implementation, when the network distributed in the first cell is the 5G network, the terminal device can firstly confirm uplink-and-downlink slot and configuration of symbol resources of the first cell according to the message entity of "tdd-UL-DL-ConfigurationCommon" in SIB Type1 of the first cell.

The terminal device may calculate the theoretical value of the uplink peak rate (peak-T-put-UL) and the theoretical value of the downlink peak rate (Peak-T-put-DL) according to the determined uplink-and-downlink slot and symbol resource configuration information and the terminal device category. When the uplink throughput requirement (T-put-UL-requirement)>Peak-T-put-UL*Th, and the downlink throughput requirement (T-put-DL-requirement)>Peak-T-put-UL*Th, the throughput of the first cell is determined to satisfy the target throughput requirement; otherwise, the throughput of the first cell is determined not to satisfy the target throughput requirement.

At 350, search for a second cell satisfying a target camping condition.

If the terminal device determines that the throughput of the first cell does not satisfy the target throughput requirement at 340, the second cell needs to be determined, where the second cell operates in the FDD mode and satisfies the target camping condition. The second cell may belong to the second access network device illustrated in FIG. 1, and certainly, the second cell may also belong to the third access network device, which is merely an example and is not limited herein.

The terminal device may determine the second cell through manual network selection, and in the process of manual network selection, the terminal device only selects a cell working in the FDD mode. Additionally, the target camping condition is determined by a cell selection reception level value (Srxlev), and the target camping condition may be Srxlev>0. It should be noted that, the terminal device may determine the second cell by searching for the second cell through manual network selection. When the second cell is found, the terminal device determines the second cell as the first target cell, and performs operations at 360. If the terminal device finds no second cell, that is, no second cell is determined, it means that the terminal device does not find any cell that operates in the FDD mode and satisfies the target camping condition through manual network selection either, and then the terminal device will perform operations at 370 to select the first cell for communication.

At 360, select a second cell for communication, and report a terminal capability.

Figure 4:
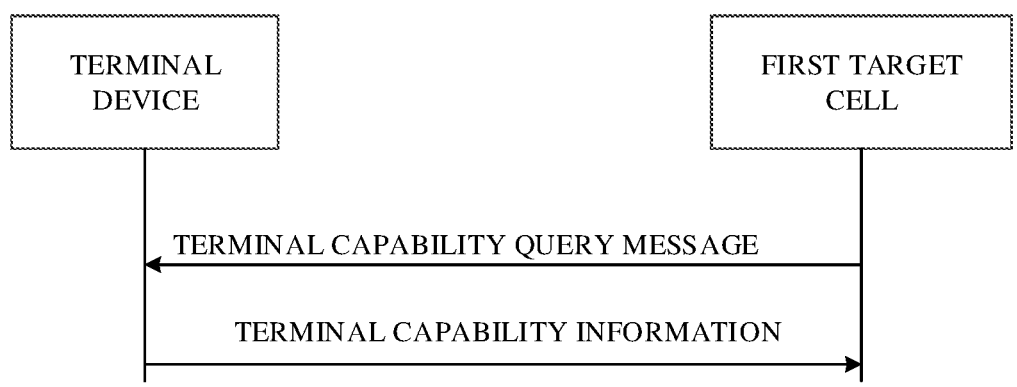
FIG. 4 is a schematic diagram of a method for reporting a terminal capability provided in implementations of the present disclosure.

Since the terminal device has determined the second cell as the first target cell at 350, the terminal device may select the first target cell for communication, and when the terminal device registers on the first target cell, the terminal device needs to report terminal-device capability. As illustrated in FIG. 4, a terminal device first receives a terminal capability query message sent through the first target cell by an access network device of the first target cell, that is, a second access network device, and the terminal device may send the terminal capability information to the second access network device through the first target cell to perform capability reporting. The terminal capability information sent by the terminal device may indicate that the terminal device is to shield the TDD frequency band. In this way, the second access network device may consider that the terminal device does not operate in the TDD mode, and will shield the TDD frequency band when selecting a network for the terminal device subsequently.

At 370, the terminal device completes network-camping, and provides a communication service normally.

After successfully determining the first target cell, the terminal device completes network-camping and performs communication normally.

In a possible implementation, at 350, if the terminal device does not find any cell that operates in the FDD mode and satisfies the target camping condition through manual network selection, the terminal device performs operations at 370. The terminal device may select the first cell currently measured for communication. Definitely, the throughput of the first cell does not satisfy the target throughput requirement, and the terminal device may output first alarm information, where the first alarm information may indicate that the throughput of the first cell does not satisfy the target throughput requirement, and there is a risk that an expected data throughput is unable to be provided.

Through implementations of the present disclosure, after determining that the network camping preferable mode is the rate-based selection mode, the terminal device determines whether the first cell is the first target cell by determining whether the throughput of the first cell satisfies a target throughput. When the terminal device determines that the first cell is the first target cell, the terminal device may directly select the first cell for communication. If the terminal device detects that the throughput of the first cell does not satisfy a throughput requirement, the terminal device may further search for the second cell satisfying the target camping condition through manual network selection in the FDD frequency band, and determine the second cell as the first target cell. In this way, the terminal device can determine the first target cell whose throughput satisfies the target throughput. By means of the method, the terminal device selects the first target cell for communication, so that a communication rate of the terminal device can be improved.

Figure 5:
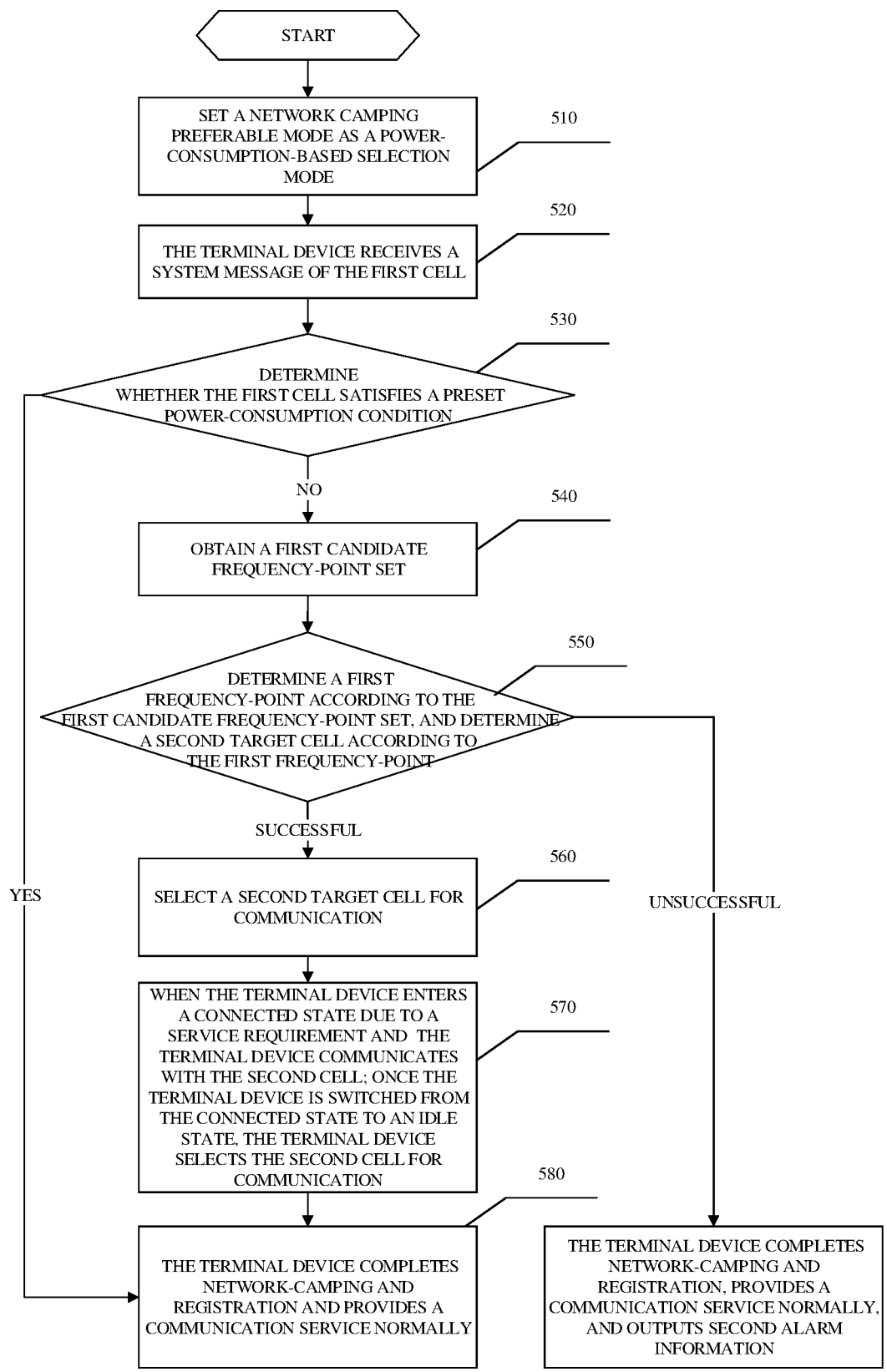
FIG. 5 is a schematic flowchart of selection of a second target cell according to a power-consumption-based selection mode provided in implementations of the present disclosure.

Reference is made to FIG. 5, which is a schematic flowchart of selection of a second target cell according to a power-consumption-based selection mode provided in implementations of the present disclosure. In other words, implementations as illustrated in FIG. 5 is a detailed description of operations at 230, and the schematic flowchart as illustrated in FIG. 5 may include the following.

At 510, set a network camping preferable mode as a power-consumption-based selection mode.

At 520, the terminal device receives a system message of a first cell.

The system message may be an SIB, and the system message carries a cell selection reception level value (Srxlev) and a cell selection quality value (Squal). The first cell is a cell currently measured by the terminal device, and the first cell may belong to the first access network device in FIG. 1.

At 530, determine whether the first cell satisfies a preset power-consumption condition.

The preset power-consumption condition may be Srxlev>SIntraSearchP and Squal>SIntraSearchQ, and Srxlev>SnonIntraSearchP and Squal>SnonIntraSearchQ. Srxlev is a cell selection reception level value (in dB), Squal is a cell selection quality value, SIntraSearchP represents a threshold intra-frequency measurement Srxlev (in dB), SIntraSearchQ represents a threshold intra-frequency measurement Squal, SnonIntraSearchP represents a threshold Srxlev (in dB) of inter-frequency measurement and inter-system measurement of the access network device, and SnonIntraSearchQ represents a threshold Squal (in dB) of inter-frequency measurement and inter-system measurement of the access network device.

If the terminal device determines that the first cell satisfies the preset power-consumption condition, the terminal device may determine that the first cell is a cell with low power consumption, determine the first cell as the second target cell, and perform operations at 580 to select the first cell (the second target cell) for communication. If the terminal device determines that the first cell does not satisfy the preset power-consumption condition, proceed to operations at 540 to select another cell.

In a possible implementation, the terminal device may first determine whether the first cell satisfies Srxlev>SIntraSearchP and Squal>SIntraSearchQ. If yes, intra-frequency measurement does not need to be performed. The terminal device then determines whether the first cell satisfies Srxlev>SnonIntraSearch P and Squal>SnonIntraSearch Q. If yes, inter-frequency or inter-system cell measurement with the same or lower priority does not need to be performed. In this way, whether the current first cell satisfies the preset power-consumption condition can be determined. A 4G network or a 5G network may be distributed in the first cell, which is not limited in implementations of the present disclosure.

At 540, obtain a first candidate frequency-point set.

The first candidate frequency-point set may include one or more frequency points satisfying the preset power-consumption condition.

In a possible implementation, the terminal device can perform neighbouring cell measurement, and arrange surrounding frequency points in descending order of signal strength, so as to obtain a frequency-point list, where the frequency-point list can include frequency points satisfying the preset power-consumption condition, and can also include frequency points not satisfying the preset power-consumption condition. That is to say, the frequency-point list includes all frequency points that can be searched out by the terminal device, for example, as long as signal strength of a frequency point is greater than a preset threshold, the terminal device can search out the frequency point and record the frequency point into the frequency-point list.

For each frequency point in the frequency-point list, the terminal device may read a system message of a cell with the strongest signal strength, so as to extract frequency points satisfying the preset power-consumption condition. The terminal device sorts the frequency points extracted in descending order of signal strength of each frequency point, and finally obtain the first candidate frequency-point set. After the terminal device reads the system message of the cell with the strongest signal strength for each frequency point in the frequency-point list, if no frequency point is determined to satisfy the preset power-consumption condition, the terminal device determines that no first candidate frequency-point set exists and no second target cell can be determined, and then proceeds to operations at 580 to select the first cell for communication.

At 550, determine a first frequency-point according to the first candidate frequency-point set, and determine a second target cell according to the first frequency-point.

If one or more frequency points exist in the first candidate frequency-point set, a first frequency-point can be determined, where the first frequency-point is a frequency point with the strongest signal strength in the first candidate frequency-point set. The second target cell is a cell with the strongest signal strength in the first frequency-point. The second target cell may belong to the second access network device as illustrated in FIG. 1. It should be noted that, multiple frequency points may be distributed by one access network device, and one frequency point may be distributed in multiple cells. In consideration of communication quality, the terminal device may select a cell with strongest signal quality in the first frequency-point as the second target cell. After determining the second target cell, the terminal device may perform operations at 560.

Optionally, in the process of determining the second target cell according to the first frequency-point, the second target cell may be determined according to a system message of the second target cell. The terminal device at least needs to obtain a system message of type 3 (SIB Type 3) of a cell (the second target cell) with the strongest signal strength in the first frequency-point, so as to obtain SIntraSearch P, SIntraSearch Q, SnonIntraSearch P, and SnonIntraSearch Q used for condition determination.

At 560, select a second target cell for communication.

If the terminal device determines the second target cell successfully at 550, the terminal device may select the second target cell for communication, and complete a registration process.

At 570, when the terminal device enters a connected state due to a service requirement and communicates with the second cell, the terminal device selects the second target cell for communication once the terminal device is switched from the connected state to an idle state.

Execution of operations at 570 is based on execution of operations at 530 by the terminal device, in other words, operations at 570 are executed on the basis that the terminal device detects that the first cell does not satisfy the preset power-consumption condition, and then reselects a cell to determine the second target cell. After the terminal device camps on the second target cell determined at 560, the terminal device is in a first state, that is, the idle state. When a service needs to be transmitted, but traffic of the service in the second target cell is large at this time, the second access network device may switch the terminal device to the second cell for service transmission due to reasonable allocation. The second cell is different from the second target cell. At this time, the terminal device is in a second state, i.e. the connected state, and does not have the initiative to switch cells. However, the second cell may not satisfy the preset power-consumption condition, and when the terminal device is switched from the connected state back to the idle state, the terminal device has initiative to switch cells, so that the terminal device is disconnected from the second cell, and selects the second target cell for communication.

At 580, the terminal device completes network-camping and registration, and provides a communication service normally.

After successfully determining the second target cell, the terminal device completes network-camping and registration, and performs communication normally.

In a possible implementation, at 550, if no first candidate frequency-point set exists, no first frequency-point can be successfully determined from the first candidate frequency-point set by the terminal device, and thus the second target cell is unable to be determined accordingly. In this case, the terminal device will select the first cell currently measured for communication. Certainly, the first cell does not satisfy the preset power-consumption condition, the terminal device may output second alarm information, where the second alarm information may indicate that the first cell does not satisfy the preset power-consumption condition, and there is a risk that expected low power consumption performance is unable to be provided.

By means of the method, after obtaining that the network camping preferable mode is the power-consumption-based selection mode, the terminal device determines whether the first cell is the second target cell by determining whether the first cell satisfies the preset power-consumption condition. When the terminal device determines that the first cell is the second target cell, the terminal device may directly select the first cell for communication. When the terminal device detects that the first cell does not satisfy the preset power-consumption condition, the terminal device may also determine the first frequency-point according to the first candidate frequency-point set, and then determine the second target cell according to the first frequency-point. By means of the method, the terminal device selects the second target cell for communication, so that communication power-consumption of the terminal device can be reduced.

Figure 6:
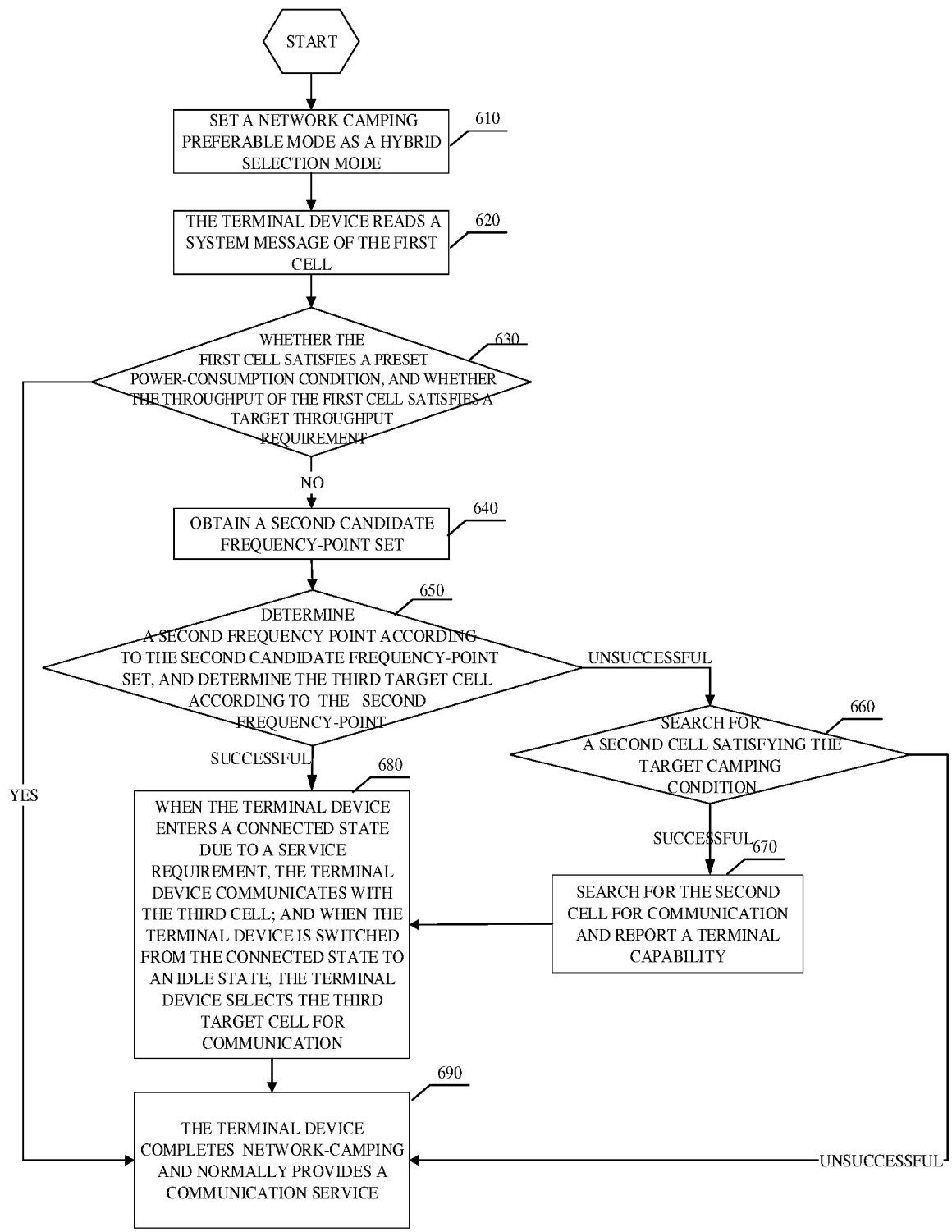
FIG. 6 is a schematic flowchart of selection of a third target cell according to a hybrid selection mode provided in implementations of the present disclosure.

Reference is made to FIG. 6, which is a schematic flowchart of selection of a third target cell according to a hybrid selection mode provided in implementations of the present disclosure. In other words, implementation as illustrated in FIG. 6 is a detailed description of operations at 240, and the schematic flowchart as illustrated in FIG. 6 may include the following.

At 610, set a network camping preferable mode as a hybrid selection mode.

The hybrid selection mode may be a rate-and-power-consumption compromise mode.

At 620, the terminal device reads a system message of a first cell.

The system message may be an SIB, and the system message carries a cell selection reception level value (Srxlev) and a cell selection quality value (Squal), and may also carry mode information of the first cell, where the mode information indicates that the first cell operates in an FDD mode or a TDD mode. The first cell is a cell currently measured by the terminal device, and the first cell may belong to the first access network device in FIG. 1.

630, determine whether the first cell satisfies a preset power-consumption condition, and whether the throughput of the first cell satisfies a target throughput requirement.

The terminal device needs to determine whether the first cell satisfies the preset power-consumption condition and whether the throughput satisfies the target throughput requirement. If the first cell satisfies the preset power-consumption condition and the throughput satisfies the target throughput requirement, determine the first cell as a third target cell, and proceed to operations at 690 to select the first cell (the third target cell) for communication. When the terminal device detects that the first cell does not satisfy the preset power-consumption condition and/or the throughput does not satisfy the target throughput requirement, proceed to operations at 640 to select another cell.

At 640, obtain a second candidate frequency-point set.

The second candidate frequency-point set may include one or more frequency points satisfying a preset power-consumption condition, and throughput of said one or more frequency points satisfies the target throughput requirement.

In a possible implementation, the terminal device can perform neighbouring cell measurement, and arrange surrounding frequency-points in descending order of signal strength, so as to obtain a frequency-point list. The frequency-point list can include frequency points satisfying the preset power-consumption condition, and throughput of the one or more frequency points satisfies the target throughput requirement. The frequency-point list can also include frequency points not satisfying the preset power-consumption condition and/or throughput of the one or more frequency points satisfies the target throughput requirement. The first N frequency points in the frequency-point list are FDD frequency points, and the N FDD frequency points are also arranged in descending order of signal strength, so that the terminal device can attempt to camp on a cell of a FDD frequency-point preferentially, and the network camping efficiency can be improved.

The terminal device may read a system message of a cell with the strongest signal strength for each frequency point in the frequency-point list, so as to extract frequency points satisfying the preset power-consumption condition and having throughput satisfying the target throughput requirement from the frequency-point list, sort the frequency points extracted in descending order of signal strength of each frequency point, and finally obtain the second candidate frequency-point set. The FDD frequency-points in the second candidate frequency-point set may be arranged in front of multiple frequency points recorded in descending order of signal strength. It can be understood that the second candidate frequency-point set can include one or more frequency points, and when the second candidate frequency-point set includes no frequency point, it is considered that no second candidate frequency-point set exists.

In a possible implementation, when the terminal device reads the system message of the cell with the strongest signal strength for each frequency point in the frequency-point list, the terminal device can first determine whether a frequency point satisfies the preset power-consumption condition, and if the frequency point satisfies the preset power-consumption condition, the terminal device continues to determine whether the throughput of the frequency point satisfies the target throughput requirement. When the terminal device determines that no frequency point satisfies the preset power-consumption condition, that is, no second candidate frequency-point set can be obtained, proceed to operations at 660 to determine the third target cell through manual network selection.

At 650, determine a second frequency point according to the second candidate frequency-point set, and determine the third target cell according to the second frequency-point.

If one or more frequency points exist in the second candidate frequency-point set, the second frequency point can be determined, where the second frequency point is a frequency point with the strongest signal strength in the second candidate frequency-point set. The third target cell is a cell with the strongest signal strength in the first frequency-point. The third target cell may belong to the second access network device illustrated in FIG. 1. After determining the third target cell, the terminal device may perform operations at 680.

Alternatively, when the third target cell is determined according to the second frequency point, the third target cell may be determined through a system message of the third target cell. The terminal device at least needs to obtain a system message of type 3 (SIB Type 3) of a cell (the third target cell) with the strongest signal strength in the second frequency point, so as to obtain SIntraSearch P, SIntraSearch Q, SnonIntraSearch P, and SnonIntraSearch Q used for condition determination.

660, search for a second cell satisfying the target camping condition.

If neighbouring cells of the terminal device do not have a frequency point satisfying the preset power-consumption condition and having throughput satisfying the target throughput requirement at 650, the second cell needs to be determined, where the second cell operates in an FDD mode and satisfies the target camping condition. The second cell may belong to the third access network device illustrated in FIG. 1, and certainly, the second cell may also belong to the first or second access network device, which is merely an example and is not limited herein. The terminal device may determine the second cell through manual network selection, and in the process of manual network selection, the terminal device only selects a cell operating in the FDD mode. Additionally, the target camping condition is determined according to the cell selection reception level value (Srxlev), and the target camping condition may be Srxlev>0. It should be noted that, the terminal device may determine the second cell by searching for the second cell through manual network selection, and when the second cell is found, the terminal device determines the second cell as the third target cell, and performs operations at 670. When the terminal device does not find any second cell, that is, no second cell is determined, it means that the terminal device does not find any cell that operates in the FDD mode and satisfies the target camping condition through manual network selection either, and at this time, the terminal device performs operations at 690 to select the first cell for communication.

It should be noted that, in this step, the second cell is determined through manual network selection, and since the second cell is an FDD cell, the throughput of the second cell can satisfy the target throughput requirement. However, since this step is executed when the terminal device fails to determine the third target cell according to the second candidate frequency-point set, the second cell may not satisfy the preset power-consumption condition, and in this case, the terminal device focuses on whether the throughput of the second cell satisfies the requirements, and does not care about the power consumption of the second cell. That is to say, when the network camping preferable mode of the terminal device is a hybrid selection mode, i.e. a rate-and-power-consumption compromise mode, the cell selected by the terminal device should take both the rate and power consumption into account as much as possible, and only when no cell capable of taking both the rate and power consumption into account exists in the environment, the terminal device can reduce a network camping requirement, and selects a cell with a relatively high rate and satisfying the target camping condition for communication.

At 670, search for the second cell for communication and report a terminal capability.

If the terminal device determines that the second cell is the third target cell through manual network selection successfully at 660, the terminal device reports the terminal-device capability when the terminal device registers on the third target cell. Terminal capability information sent by the terminal device to an access network device corresponding to the third target cell may indicate that the terminal device is to shield the TDD frequency band, so that the access network device corresponding to the third target cell may consider that the terminal device does not operate in the TDD mode, and will shield the TDD frequency band when selecting a network for the terminal device subsequently.

At 680, when the terminal device enters a connected state due to a service requirement and the terminal device communicates with the third cell, the terminal device selects the third target cell for communication once the terminal device is switched from the connected state to an idle state.

Execution of operations at 680 is based on execution of operations at 640 by the terminal device, in other words, operations at 690 are executed on the basis that the terminal device detects that the first cell does not satisfy the preset power-consumption condition and/or the throughput of the first cell does not satisfy the target throughput requirement, and then reselects a cell to determine the third target cell. After the terminal device camps on the third target cell determined at 650 or at 660, the terminal device is in a first state, that is, the idle state. When a service needs to be transmitted, but traffic of the service volume in the third target cell is large at this time, the access network device corresponding to the third target cell may switch the terminal device to the third cell for service transmission due to reasonable allocation. The third cell is different from the third target cell, and at this time, the terminal device is in a second state, i.e. a connected state, and does not have the initiative to switch cells. However, the third cell may not satisfy the preset power-consumption condition and/or the throughput of the third cell may not satisfy the target throughput requirement. When the terminal device is switched from the connected state back to the idle state, the terminal device has the initiative to switch cells, so that the terminal device is disconnected from the third cell, and selects the third target cell for communication.

At 690, the terminal device completes network-camping and provides a communication service normally.

After successfully determining the third target cell, the terminal device completes network-camping and registration and performs communication normally.

In a possible implementation, if the terminal device does not find any cell operating in the FDD mode and satisfying the target camping condition through manual network selection, the terminal device will select the first cell for communication. However, the first cell does not satisfy the preset power-consumption condition, and/or the throughput of the first cell does not satisfy the target throughput requirement. The terminal device may output third alarm information, and the third alarm information may indicate that the first cell does not satisfy the preset power-consumption condition and/or the throughput of the first cell does not satisfy the target throughput requirement, and there is a risk that an expected data throughput and/or an expected low power consumption is unable to be provided.

Through implementations of the present disclosure, after obtaining that the network camping preferable mode is the hybrid selection mode, the terminal device can determine whether the first cell is the third target cell by determining whether the first cell satisfies the preset power-consumption condition and/or whether the throughput of the first cell satisfies the target throughput requirement. When the terminal device determines that the first cell is the third target cell, the terminal device may directly select the first cell for communication. When the terminal device detects that the first cell does not satisfy these two conditions at the same time, the third target cell may also be determined according to the second candidate frequency-point set and through manual network selection. By means of the method, the terminal device selects the third target cell for communication, which can improve a communication rate and reduce communication power consumption.

Figure 7:
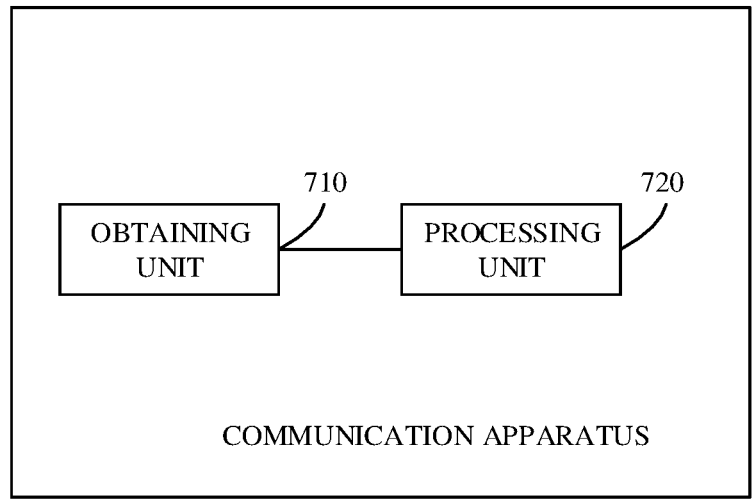
FIG. 7 is a schematic diagram of units of a communication apparatus provided in implementations of the present disclosure.

Reference is made to FIG. 7, which is a schematic diagram of units of a communication apparatus provided in implementations of the present disclosure. The communication apparatus illustrated in FIG. 7 may be configured to perform a part or all of functions of the terminal device in method implementations described in FIGS. 2, 3, 5, and 6. The apparatus may be a terminal device, an apparatus in the terminal device, or an apparatus that can be matched with the terminal device for use. A logical structure of the apparatus may include an obtaining unit 710 and a processing unit 720. When the communication apparatus is applied a data transmission method, the apparatus may include the following.

The obtaining unit 710 is configured to obtain a network camping preferable mode, where the network camping preferable mode includes a rate-based selection mode, a power-consumption-based selection mode, and a hybrid selection mode.

The processing unit 720 is configured to select a first target cell for communication when the network camping preferable mode is the rate-based selection mode, where throughput of the first target cell satisfies a target throughput requirement; or the processing unit 720 is configured to select a second target cell for communication when the network camping preferable mode is the power-consumption-based selection mode, where the second target cell satisfies a preset power-consumption condition, and the preset power-consumption condition is determined according to a cell selection reception level value and a cell selection quality value; or the processing unit 720 is configured to select a third target cell for communication when the network camping preferable mode is the hybrid selection mode, where the third target cell satisfies the preset power-consumption condition, and/or throughput of the third target cell satisfies the target throughput requirement.

In a possible implementation, the processing unit 720 is further configured to determine a first cell as the first target cell when the first cell operates in a frequency-division duplex (FDD) mode.

In a possible implementation, the processing unit 720 is further configured to determine whether throughput of the first cell satisfies the target throughput requirement when the first cell operates in a time-division duplex (TDD) mode; and determine the first cell as the first target cell when the throughput of the first cell satisfies the target throughput requirement.

In a possible implementation, the processing unit 720 is further configured to determine a second cell when the throughput of the first cell does not satisfy the target throughput requirement, where the second cell operates in the FDD mode and satisfies a target camping condition, and the target camping condition is determined according to the cell selection reception level value; and determine the second cell as the first target cell.

In a possible implementation, after determining the second cell as the first target cell when the throughput of the first cell does not satisfy the target throughput requirement, the processing unit 720 is further configured to transmit terminal-device capability information to an access network device corresponding to the first target cell, where the terminal-device capability information indicates that a terminal device is to shield a TDD frequency band.

In a possible implementation, the processing unit 720 is further configured to select the first cell for communication when no second cell is determined successfully; and output first alarm information, where the first alarm information indicates that the first cell does not satisfy the target throughput requirement.

In a possible implementation, the processing unit 720 is further configured to determine a first cell as the second target cell when the first cell satisfies the preset power-consumption condition.

In a possible implementation, the processing unit 720 is further configured to select, from a first candidate frequency-point set, a frequency point with strongest signal strength as a first frequency-point, when the first cell does not satisfy the preset power-consumption condition, where the first candidate frequency-point set includes one or more frequency points satisfying the preset power-consumption condition; and determine a cell with strongest signal strength in the first frequency-point as the second target cell.

In a possible implementation, after determining the cell with the strongest signal strength in the first frequency-point as the second target cell, the processing unit 720 is further configured to select a second cell for communication when the terminal device is switched from a first state to a second state, where the second cell is different from the second target cell; and select the second target cell for communication when the terminal device is switched from the second state to the first state.

In a possible implementation, the processing unit 720 is further configured to select the first cell for communication when no first candidate frequency-point set exists; and output second alarm information, where the second alarm information indicates that the first cell does not satisfy the preset power-consumption condition.

In a possible implementation, the processing unit 720 is further configured to determine whether throughput of a first cell satisfies the target throughput requirement when the first cell satisfies the preset power-consumption condition; and determine the first cell as the third target cell when the throughput of the first cell satisfies the target throughput requirement.

In a possible implementation, the processing unit 720 is further configured to select, from a second candidate frequency-point set, a frequency point with strongest signal strength as a second frequency point, when throughput of a first cell does not satisfy the target throughput requirement and/or the first cell does not satisfy the preset power-consumption condition, where the second candidate frequency-point set includes one or more frequency points satisfying the preset power-consumption condition, throughput of the one or more frequency points satisfies the target throughput requirement; and determine a cell with the strongest signal strength in the second frequency point as the third target cell.

In a possible implementation, the processing unit 720 is further configured to determine a second cell when no second candidate frequency-point set exists, where the second cell operates in the FDD mode and satisfies a target camping condition, and the target camping condition is determined according to the cell selection reception level value; and determine the second cell as the third target cell.

In a possible implementation, after determining the second cell as the third target cell, the processing unit 720 is further configured to transmit terminal-device capability information to an access network device corresponding to the third target cell, where the terminal-device capability information indicates that the terminal device is to shield a TDD frequency band.

In a possible implementation, the processing unit 720 is further configured to select a third cell for communication when the terminal device is switched from a first state to a second state, where the third cell is different from the third target cell; and select the third target cell for communication when the terminal device is switched from the second state to the first state.

In a possible implementation, the processing unit 720 is further configured to select the first cell for communication when no third cell is determined successfully.

Figure 8:
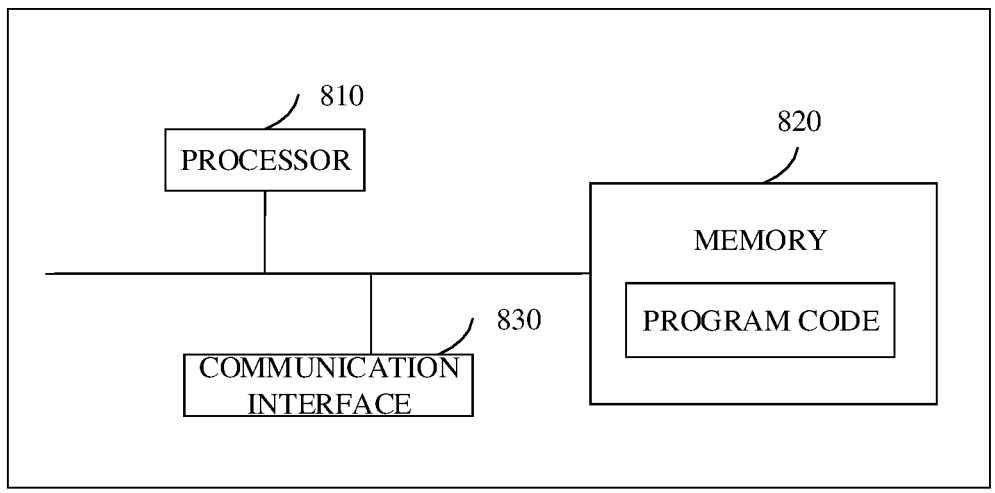
FIG. 8 is a simplified schematic diagram of a physical structure of a communication apparatus provided in implementations of the present disclosure.

Reference is made to FIG. 8, which is a simplified schematic diagram of a physical structure of a communication apparatus provided in implementations of the present disclosure. The apparatus includes a processor 810, a memory 820, and a communication interface 830. The processor 810, the memory 820, and the communication interface 830 are connected via one or more communication buses.

The processor 810 is configured to support a communication apparatus to perform functions corresponding to the methods illustrated in FIGS. 2, 3, 5, and 6. The processor 810 may be a central processing unit (CPU), a network processor (NP), a hardware chip, or any combination thereof.

The memory 820 is configured to store a program code, and the like. The memory 820 may include a volatile memory, such as a random access memory (RAM). The memory 820 may also include a non-volatile memory, such as a read-only memory (ROM), a flash memory, a hard disk drive (HDD), or a solid-state drive (SSD). The memory 820 may also include a combination of memories of these kinds described above.

The communications interface 830 is configured to receive and send data, information, or messages, and may also be described as a transceiver, a transceiving circuit, or the like. For example, the communications interface 830 is configured to receive, by the terminal device, a terminal capability query message from the access network device.

In implementations of the present disclosure, when the communication apparatus is applied to a terminal device and applied to a data transmission method, the processor 810 may invoke the program code stored in the memory 820 to execute following operations.

The processor 810 invokes the program code stored in the memory 820 to obtain a network camping preferable mode, where the network camping preferable mode includes a rate-based selection mode, a power-consumption-based selection mode, and a hybrid selection mode.

The processor 810 invokes the program code stored in the memory 820 to select a first target cell for communication when the network camping preferable mode is the rate-based selection mode, where throughput of the first target cell satisfies a target throughput requirement. Or the processor 810 invokes the program code stored in the memory 820 to select a second target cell for communication when the network camping preferable mode is the power-consumption-based selection mode, where the second target cell satisfies a preset power-consumption condition, and the preset power-consumption condition is determined according to a cell selection reception level value and a cell selection quality value. Or the processor 810 invokes the program code stored in the memory 820 to select a third target cell for communication when the network camping preferable mode is the hybrid selection mode, where the third target cell satisfies the preset power-consumption condition, and/or throughput of the third target cell satisfies the target throughput requirement.

In a possible implementation, the processor 810 invokes the program code stored in the memory 820 to determine a first cell as the first target cell when the first cell operates in a frequency-division duplex (FDD) mode.

In a possible implementation, the processor 810 invokes the program code stored in the memory 820 to determine whether throughput of the first cell satisfies the target throughput requirement when the first cell operates in a time-division duplex (TDD) mode; and determine the first cell as the first target cell when the throughput of the first cell satisfies the target throughput requirement.

In a possible implementation, the processor 810 invokes the program code stored in the memory 820 to determine a second cell when the throughput of the first cell does not satisfy the target throughput requirement, where the second cell operates in the FDD mode and satisfies a target camping condition, and the target camping condition is determined according to the cell selection reception level value; and determine the second cell as the first target cell.

In a possible implementation, after determining the second cell as the first target cell when the throughput of the first cell does not satisfy the target throughput requirement, the processor 810 invokes the program code stored in the memory 820 to transmit terminal-device capability information to an access network device corresponding to the first target cell, where the terminal-device capability information indicates that a terminal device is to shield a TDD frequency band.

In a possible implementation, the processor 810 invokes the program code stored in the memory 820 to select the first cell for communication when no second cell is determined successfully; and output first alarm information, where the first alarm information indicates that the first cell does not satisfy the target throughput requirement.

In a possible implementation, the processor 810 invokes the program code stored in the memory 820 to determine a first cell as the second target cell when the first cell satisfies the preset power-consumption condition.

In a possible implementation, the processor 810 invokes the program code stored in the memory 820 to select, from a first candidate frequency-point set, a frequency point with strongest signal strength as a first frequency-point, when the first cell does not satisfy the preset power-consumption condition, where the first candidate frequency-point set includes one or more frequency points satisfying the preset power-consumption condition; and determine a cell with strongest signal strength in the first frequency-point as the second target cell.

In a possible implementation, the processor 810 invokes the program code stored in the memory 820 to select a second cell for communication when the terminal device is switched from a first state to a second state, where the second cell is different from the second target cell; and select the second target cell for communication when the terminal device is switched from the second state to the first state.

In a possible implementation, the processor 810 invokes the program code stored in the memory 820 to select the first cell for communication when no first candidate frequency-point set exists; and output second alarm information, where the second alarm information indicates that the first cell does not satisfy the preset power-consumption condition.

In a possible implementation, the processor 810 invokes the program code stored in the memory 820 to determine whether throughput of a first cell satisfies the target throughput requirement when the first cell satisfies the preset power-consumption condition; and determine the first cell as the third target cell when the throughput of the first cell satisfies the target throughput requirement.

In a possible implementation, the processor 810 invokes the program code stored in the memory 820 to select, from a second candidate frequency-point set, a frequency point with strongest signal strength as a second frequency point, when throughput of a first cell does not satisfy the target throughput requirement and/or the first cell does not satisfy the preset power-consumption condition, where the second candidate frequency-point set includes one or more frequency points satisfying the preset power-consumption condition, and throughput of the one or more frequency points satisfies the target throughput requirement; and determine a cell with the strongest signal strength in the second frequency point as the third target cell.

In a possible implementation, the processor 810 invokes the program code stored in the memory 820 to determine a second cell when no second candidate frequency-point set exists, where the second cell operates in the FDD mode and satisfies a target camping condition, and the target camping condition is determined according to the cell selection reception level value; and determine the second cell as the third target cell.

In a possible implementation, after determining the second cell as the third target cell, the processor 810 invokes the program code stored in the memory 820 to transmit terminal-device capability information to an access network device corresponding to the third target cell, where the terminal-device capability information indicates that the terminal device is to shield a TDD frequency band.

In a possible implementation, the processor 810 invokes the program code stored in the memory 820 to select a third cell for communication when the terminal device is switched from a first state to a second state, where the third cell is different from the third target cell; and select the third target cell for communication when the terminal device is switched from the second state to the first state.

In a possible implementation, the processor 810 invokes the program code stored in the memory 820 to select the first cell for communication when no third cell is determined successfully.

It should be noted that, In the foregoing implementations, the description of each implementation has its own emphasis. For the parts not described in detail in one implementation, reference may be made to related descriptions in other implementations.

Steps in methods according to implementations of the present disclosure may be adjusted sequentially, combined, and deleted according to actual requirements.

Units in a processing device according to implementation of the present disclosure may be combined, divided, and deleted according to actual requirements.

All or part of the above implementations can be implemented through software, hardware, firmware, or any other combination thereof. When implemented by software, all or part of the above implementations can be implemented in the form of a computer program product. The computer program product includes one or more computer instructions. When the computer instructions are applied and executed on a computer, all or part of the operations or functions of the implementations of the disclosure are performed. The computer can be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It should be noted finally that the foregoing implementations are merely intended for describing technical solutions of the present disclosure rather than limiting the present disclosure. Although the present disclosure is described in detail with reference to the foregoing implementations, persons of ordinary skill in the art should understand that modifications to the technical solutions described in the foregoing implementations, or equivalent replacements to some or all technical features of the technical solutions can still be made. These modifications or replacements do not make the essence of corresponding technical solutions depart from the scope of the technical solutions of implementations of the present disclosure.

What is claimed is:

1. A communication method for a multimode terminal, comprising:
obtaining a network camping preferable mode, wherein the network camping preferable mode comprises a rate-based selection mode, a power-consumption-based selection mode, and a hybrid selection mode; and
selecting a first target cell for communication when the network camping preferable mode is the rate-based selection mode, wherein throughput of the first target cell satisfies a target throughput requirement; or
selecting a second target cell for communication when the network camping preferable mode is the power-consumption-based selection mode, wherein the second target cell satisfies a preset power-consumption condition, and the preset power-consumption condition is determined according to a cell selection reception level value and a cell selection quality value; or
selecting a third target cell for communication when the network camping preferable mode is the hybrid selection mode, wherein the third target cell satisfies the preset power-consumption condition, and/or throughput of the third target cell satisfies the target throughput requirement.

2. The method according to claim 1, wherein selecting the first target cell for communication when the network camping preferable mode is the rate-based selection mode comprises:
determining a first cell as the first target cell when the first cell operates in a frequency-division duplex (FDD) mode.

3. The method according to claim 2, further comprising:
determining whether throughput of the first cell satisfies the target throughput requirement when the first cell operates in a time-division duplex (TDD) mode; and
determining the first cell as the first target cell when the throughput of the first cell satisfies the target throughput requirement.

4. The method according to claim 3, further comprising:
determining a second cell when the throughput of the first cell does not satisfy the target throughput requirement, wherein the second cell operates in the FDD mode and satisfies a target camping condition, and the target camping condition is determined according to the cell selection reception level value; and
determining the second cell as the first target cell.

5. The method according to claim 4, wherein after determining the second cell as the first target cell when the throughput of the first cell does not satisfy the target throughput requirement, the method further comprises:
transmitting terminal-device capability information to an access network device corresponding to the first target cell, wherein the terminal-device capability information indicates that a terminal device is to shield a TDD frequency band.

6. The method according to claim 4, further comprising:
selecting the first cell for communication when no second cell is determined successfully; and
outputting first alarm information, wherein the first alarm information indicates that the first cell does not satisfy the target throughput requirement.

7. The method according to claim 1, wherein selecting the second target cell for communication when the network camping preferable mode is the power-consumption-based selection mode comprises:
determining a first cell as the second target cell when the first cell satisfies the preset power-consumption condition.

8. The method according to claim 1, wherein selecting the second target cell for communication when the network camping preferable mode is the power-consumption-based selection mode comprises:
selecting, from a first candidate frequency-point set, a frequency point with strongest signal strength as a first frequency-point, when the first cell does not satisfy the preset power-consumption condition, wherein the first candidate frequency-point set comprises one or more frequency points satisfying the preset power-consumption condition; and
determining a cell with strongest signal strength in the first frequency-point as the second target cell.

9. The method according to claim 8, wherein after determining the cell with the strongest signal strength in the first frequency-point as the second target cell, the method further comprises:
selecting a second cell for communication when the terminal device is switched from a first state to a second state, wherein the second cell is different from the second target cell; and
selecting the second target cell for communication when the terminal device is switched from the second state to the first state.

10. The method according to claim 8, further comprising:
selecting the first cell for communication when no first candidate frequency-point set exists; and
outputting second alarm information, wherein the second alarm information indicates that the first cell does not satisfy the preset power-consumption condition.

11. The method according to claim 1, wherein selecting the third target cell for communication when the network camping inclination is the hybrid selection mode comprises:
determining whether throughput of a first cell satisfies the target throughput requirement when the first cell satisfies the preset power-consumption condition; and
determining the first cell as the third target cell when the throughput of the first cell satisfies the target throughput requirement.

12. The method according to claim 1, wherein selecting the third target cell for communication when the network camping inclination is the hybrid selection mode comprises:
selecting, from a second candidate frequency-point set, a frequency point with strongest signal strength as a second frequency point, when throughput of a first cell does not satisfy the target throughput requirement and/or the first cell does not satisfy the preset power-consumption condition, wherein the second candidate frequency-point set comprises one or more frequency points satisfying the preset power-consumption condition, and throughput of the one or more frequency points satisfies the target throughput requirement; and
determining a cell with the strongest signal strength in the second frequency point as the third target cell.

13. The method according to claim 12, further comprising:
determining a second cell when no second candidate frequency-point set exists, wherein the second cell operates in the FDD mode and satisfies a target camping condition, and the target camping condition is determined according to the cell selection reception level value; and
determining the second cell as the third target cell.

14. The method according to claim 13, wherein after determining the second cell as the third target cell, the method further comprises:
- transmitting terminal-device capability information to an access network device corresponding to the third target cell, wherein the terminal-device capability information indicates that the terminal device is to shield a TDD frequency band.

15. The method according to claim 12, further comprising:
- selecting a third cell for communication when the terminal device is switched from a first state to a second state, wherein the third cell is different from the third target cell; and
- selecting the third target cell for communication when the terminal device is switched from the second state to the first state.

16. The method according to claim 13, further comprising:
- selecting the first cell for communication when no third cell is determined successfully.

17. A communication apparatus, comprising a processor, a memory, and a user interface, wherein the processor, the memory, and the user interface are connected with one another, the memory is configured to store a computer program, the computer program comprises a program instruction, and the processor is configured to invoke the program instruction to execute:
- obtaining a network camping preferable mode, wherein the network camping preferable mode comprises a rate-based selection mode, a power-consumption-based selection mode, and a hybrid selection mode; and
- selecting a first target cell for communication when the network camping preferable mode is the rate-based selection mode, wherein throughput of the first target cell satisfies a target throughput requirement; or
- selecting a second target cell for communication when the network camping preferable mode is the power-consumption-based selection mode, wherein the second target cell satisfies a preset power-consumption condition, and the preset power-consumption condition is determined according to a cell selection reception level value and a cell selection quality value; or
- selecting a third target cell for communication when the network camping preferable mode is the hybrid selection mode, wherein the third target cell satisfies the preset power-consumption condition, and/or throughput of the third target cell satisfies the target throughput requirement.

18. A non-transitory computer readable storage medium, wherein the computer readable storage medium stores one or more instructions, and the one or more instructions are configured to be loaded by a processor to execute:
- obtaining a network camping preferable mode, wherein the network camping preferable mode comprises a rate-based selection mode, a power-consumption-based selection mode, and a hybrid selection mode; and
- selecting a first target cell for communication when the network camping preferable mode is the rate-based selection mode, wherein throughput of the first target cell satisfies a target throughput requirement; or
- selecting a second target cell for communication when the network camping preferable mode is the power-consumption-based selection mode, wherein the second target cell satisfies a preset power-consumption condition, and the preset power-consumption condition is determined according to a cell selection reception level value and a cell selection quality value; or
- selecting a third target cell for communication when the network camping preferable mode is the hybrid selection mode, wherein the third target cell satisfies the preset power-consumption condition, and/or throughput of the third target cell satisfies the target throughput requirement.

19. The communication apparatus according to claim 17, wherein in terms of selecting the first target cell for communication when the network camping preferable mode is the rate-based selection mode, the one or more instructions are configured to be loaded by the processor to execute:
- determining a first cell as the first target cell when the first cell operates in a frequency-division duplex (FDD) mode.

20. The communication apparatus according to claim 17, wherein in terms of selecting the second target cell for communication when the network camping preferable mode is the power-consumption-based selection mode, the one or more instructions are configured to be loaded by the processor to execute:
- determining a first cell as the second target cell when the first cell satisfies the preset power-consumption condition.

* * * * *